(12) United States Patent
Fournier et al.

(10) Patent No.: US 10,499,131 B1
(45) Date of Patent: Dec. 3, 2019

(54) INTERNAL INPUT CONTROL

(71) Applicant: Apple Inc., Cupertino, CA (US)

(72) Inventors: Douglas G. Fournier, San Jose, CA (US); Daniel W. Jarvis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/271,625

(22) Filed: Feb. 8, 2019

Related U.S. Application Data

(60) Provisional application No. 62/736,079, filed on Sep. 25, 2018.

(51) Int. Cl.
| | |
|---|---|
| *H04R 1/02* | (2006.01) |
| *H04M 1/03* | (2006.01) |
| *G06F 3/16* | (2006.01) |
| *H01H 13/50* | (2006.01) |

(52) U.S. Cl.
CPC .............. *H04R 1/028* (2013.01); *G06F 3/16* (2013.01); *H04M 1/035* (2013.01); *H01H 13/50* (2013.01); *H04R 2499/11* (2013.01)

(58) Field of Classification Search
None
See application file for complete search history.

(56) References Cited

U.S. PATENT DOCUMENTS

| | | | | |
|---|---|---|---|---|
| 8,699,741 B2* | 4/2014 | Hestehave | .......... | H04M 1/6066 381/367 |
| 9,408,009 B1* | 8/2016 | Witte | ..................... | H04R 1/028 |
| 2006/0267962 A1* | 11/2006 | Baier | ..................... | F24C 7/082 345/173 |
| 2016/0217943 A1* | 7/2016 | Kim | ........................ | H01H 13/86 |

* cited by examiner

*Primary Examiner* — Paul W Huber
(74) *Attorney, Agent, or Firm* — Kilpatrick Townsend & Stockton LLP

(57) ABSTRACT

This disclosure describes a portable electronic device that includes a device housing having a device housing component defining an opening. In some embodiments, the opening can be an acoustic opening configured to accommodate the passage of audio waves into and/or out of the device housing. The portable electronic device also includes an input control disposed within the device housing; and an electrical component disposed in a first position between the input control and the opening defined by the device housing component. At least a portion of the electrical component is configured to shift from the first position to a second position in which the input control is actuated by the electrical component.

20 Claims, 7 Drawing Sheets

*C-C*

*C-C*

INTERNAL INPUT CONTROL

CROSS REFERENCES TO RELATED APPLICATIONS

This application claims priority to provisional patent application 62/736,079, filed Sep. 25, 2018, the contents of which are incorporated by reference in their entirety and for all purposes.

FIELD

The described embodiments relate generally to a input control disposed within an electronic device. In particular, the input control can be actuated by inserting an actuating component through an opening in the electronic device to shift an operational electrical component sufficiently within the electronic device to actuate the input control.

BACKGROUND

Portable electronic devices have become increasingly reliant upon the touch screen interface. While this interface type allows designers greater amounts of flexibility in presenting a digital user interface, some functions such as powering on a portable electronic device from a powered down or standby state are still best accomplished by a physical control positioned upon an exterior of the portable electronic device. This is due to the physical control requiring little or no energy expenditure to stay in a state where it is able to receive a user input, whereas keeping a touch screen interface activated or ready to be activated quickly draws substantially more energy to maintain. Unfortunately, this constrains the design of portable electronic devices as this makes the inclusion of a physical control such as a push button, toggle switch, slider switch or the like a requirement. Consequently, other low energy means for activating or changing the mode of a portable electronic device without a physical control on the outside of the portable electronic device are desirable.

SUMMARY

This disclosure describes various ways to include an internal input control within a portable electronic device. In some embodiments, the internal input control is actuated by pressing another electrical component against the internal input control.

A portable electronic device is disclosed and includes the following: a device housing defining an opening. In some embodiments, the opening can be an acoustic opening configured to accommodate the passage of audio waves into and/or out of the device housing. The portable electronic device also includes an input control disposed within the device housing; and an electrical component disposed in a first position between the input control and the opening defined by the device housing. At least a portion of the electrical component is configured to move from the first position to a second position to actuate the electrical component.

A portable electronic device is disclosed and includes the following: a device housing defining an acoustic opening; an acoustic fabric adjacent to the acoustic opening; a push button disposed within the device housing; and a microphone disposed between the push button and the acoustic opening.

An electronic device is disclosed and includes the following: a device housing having a device housing component defining an acoustic opening; an input control disposed within the device housing; and an acoustic component disposed in a first position proximate the acoustic opening and is between the input control and the acoustic opening, the acoustic component configured to move from the first position in to a second position in to actuate the input control.

The disclosure will be readily understood by the following detailed description in conjunction with the accompanying drawings, wherein like reference numerals designate like structural elements, and in which:

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
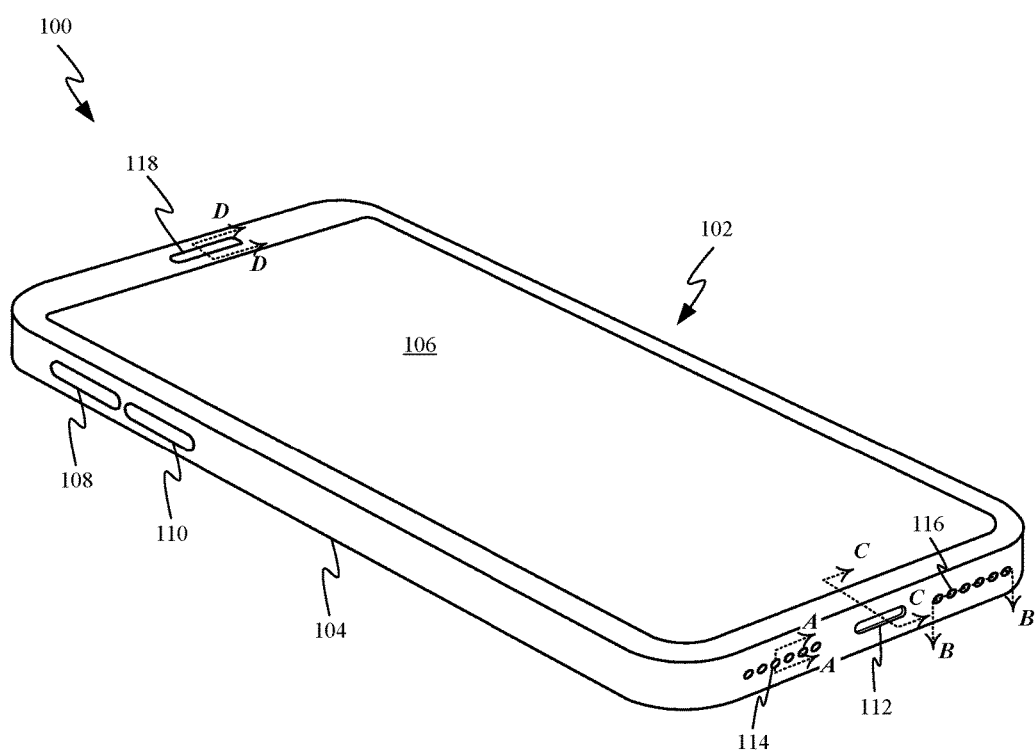
FIG. 1 shows a portable electronic device suitable for use with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A modern portable electronic devices makes heavy use of the graphical user interface, so unsurprisingly device makers have been steadily doing away with more conventional user input controls such as push buttons, switches and the like. As the openings in the device housing typically associated with these more conventional user input controls also tend to make portable electronic devices more susceptible to water and or debris intrusion, elimination of these input controls becomes increasingly attractive. Unfortunately, conventional user input controls are still needed periodically to perform certain actions such as powering on a device or initiating a maintenance mode or hard reset.

In lieu of including an additional user input control on an exterior of the portable electronic device for the purpose of maintaining these functionalities, an input control can instead be placed within the portable electronic device. In this way, the input control, which would only see occasional use and might sometimes be inadvertently actuated, could be instead accessed by inserting an actuating component through an opening in the device housing. To further optimize cosmetics and water resistance of the portable electronic device, the opening through which the actuating component is inserted can be associated with another electrical component. For example, the opening can be an acoustic opening or be associated with a digital input/output port. When the actuating component is inserted within the opening, the actuating component can be configured to move the electrical component within the portable electronic device to actuate the input control. In some embodiments, this move results in the electrical component mechanically pushing a push button or toggle switch, while in other embodiments, the actuating component or electrical component can emit a magnetic field that triggers an input control taking the form of a magnetic sensor such as a Hall Effect Sensor.

These and other embodiments are discussed below with reference to FIGS. 1-7; however, those skilled in the art will readily appreciate that the detailed description given herein with respect to these figures is for explanatory purposes only and should not be construed as limiting.

FIG. 1 shows a portable electronic device 100 suitable for use with the described embodiments. Portable electronic device 100 includes a device housing 102 formed from device housing component 104 and touch sensitive display assembly 106, which cooperate to define an interior volume within which various electrical components can be housed. Touch sensitive display assembly 106 can be configured to provide a touch sensitive user interface for controlling portable electronic device 100 and in some embodiments capable of controlling accessories to which portable electronic device 100 is electrically or wirelessly coupled. Touch sensitive display assembly 106 can include a display utilizing modern display technologies such as OLED, LCD, MicroLED and the like. In some embodiments, portable electronic device 100 can include user-accessible physical controls such as, for example, buttons 108 and 110. Portable electronic device 100 can also include one or more hard-wired input/output (I/O) ports such as digital I/O port 112 for accommodating hard-wired charging or data transfer operations. Portable electronic device 100 can also include multiple audio ports. For example, acoustic opening 114 can provide a path for audio waves to enter into the interior volume defined by device housing 102 to be detected by a microphone. Acoustic openings 116 can provide an audio port for an acoustic assembly that includes a speaker and microphone so that audio waves can enter and/or exit device housing 102. Touch sensitive display defines a third acoustic opening 118 through which audio waves are configured to exit portable electronic device 100. Audio waves exiting portable electronic device 100 through acoustic opening 118 can be useful for allowing a user to hold the device up to an ear for a phone call or also for privately playing back any other type of audio content to a user with a moderate amount of privacy.

It should be noted that as the number of physical user interface controls is reduced in favor of heavier reliance upon touch sensitive display assembly 106, it becomes harder to incorporate user controls or even combinations of user controls designed to assist in placing portable electronic device 100 in different operating modes when portable electronic device 100 is in a powered down or standby state in which touch sensitive display assembly 106 is inoperable. For example, primary and/or secondary processors of portable electronic device 100 can be deactivated in a standby or powered down mode to save power during long periods of disuse or when sitting in inventory. Consequently, advanced sensors and input controls reliant upon these processors for operation would not be operational making more conventional input controls more viable for initiating a return to a normal mode of operation. It should also be noted that while portable electronic device is depicted as a smart phone that this should not limit the scope of the disclosure. For example, other form factors such as tablets, laptops, smart watches, game consoles, portable media devices and the like are all considered to be within the scope of the embodiments disclosed herein.

Figure 2A:
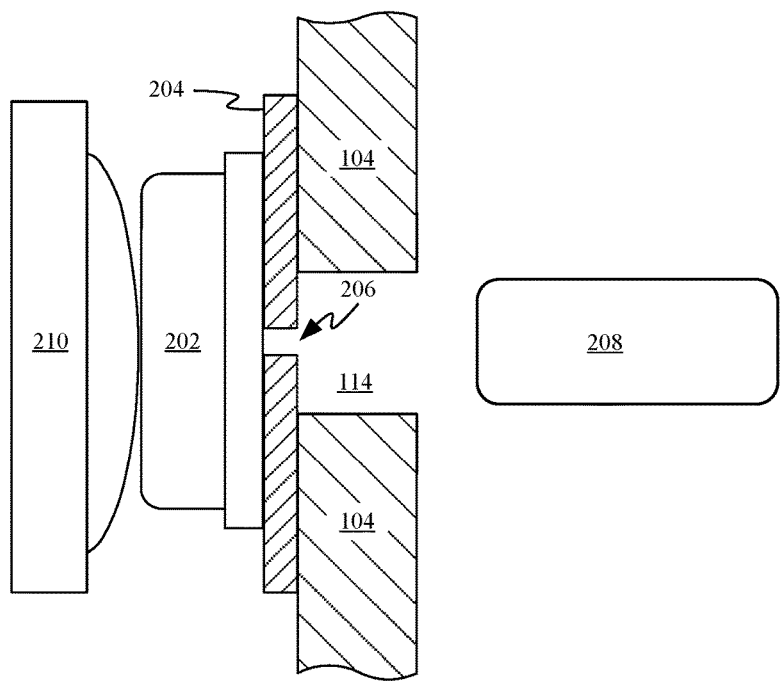
FIGS. 2A-2B show cross-sectional side views of the portable electronic device depicted in FIG. 1 in accordance with section line A-A.
Figure 2B:
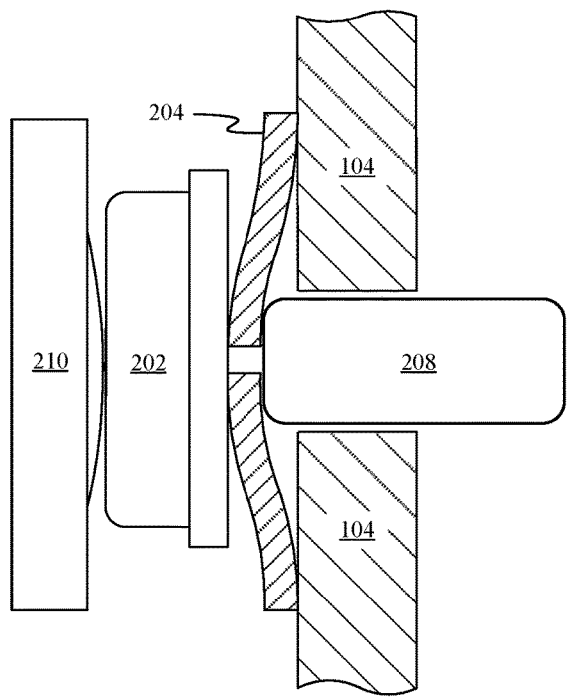

FIGS. 2A-2B show cross-sectional side views of portable electronic device 100 in accordance with section line A-A and illustrate how a microphone 202 positioned behind a layer of acoustic fabric 204 can be configured to sense audio waves propagating through acoustic opening 114. Peripheral portions of acoustic fabric 204 can be adhesively coupled to device housing component 104. In some embodiments, device housing component 104 can include a side wall of device housing 102 that defines acoustic opening 114. Acoustic fabric 204 can be substantially impermeable to liquids while allowing acoustic waves to propagate therethrough, thereby preventing any degradation to the sensitivity of microphone 202. In some embodiments, acoustic fabric 204 can include one or more openings 206 to further improve the sensitivity of microphone to any audio waves passing through acoustic opening 114. Any liquid passing through openings 206 can enter microphone 202. Microphone 202 can be a water resistant component and any water entering into microphone 202 can be prevented from any further ingress within portable electronic device 100 and water captured within microphone 202 can subsequently be dispelled from microphone 202 by the force of gravity or by natural evaporative processes.

FIG. 2A shows how an actuating component 208 can be aligned with and sized to fit through acoustic opening 114 prior to engaging acoustic fabric 204. In some embodiments, actuating component 208 can be a custom tool while in other embodiments actuating component 208 can be formed from a simple item such as a paper clip.

FIG. 2B shows how exerting a force upon acoustic fabric 204 using actuating component 208 causes acoustic fabric 204 to deform, allowing the force exerted by actuating component 208 to be transferred to microphone 202, which in turn exerts a force upon internal input control 210. Internal input control 210 can take the form of a dome switch in some embodiments, giving a user of actuating component 208 positive confirmation of internal input control 210. In some embodiments, actuating internal input control 210 can wake portable electronic device 100 from a state in which portable electronic device 100 is completely powered off. In some embodiments, internal input control 210 can be configured to initiate a hard reset for portable electronic device 100. Internal input control 210 can also be configured to place portable electronic device 100 into a maintenance or diagnostic mode. When actuating component 208 is removed from acoustic opening 114, internal input control 210 can return to the position depicted in FIG. 2A, so that microphone 202 returns to its initial position proximate acoustic opening 114.

In some embodiments, internal input control 210 can take different forms. For example, internal input control 210 could be replaced by a dip switch, a Hall Effect sensor, a toggle switch or an open/closed circuit configuration. For example, the Hall Effect sensor could be actuated by an actuating component that includes a permanent magnet configured to trigger the Hall Effect sensor. These substitutions can apply to any of the other embodiments described in this disclosure.

Figure 3A:
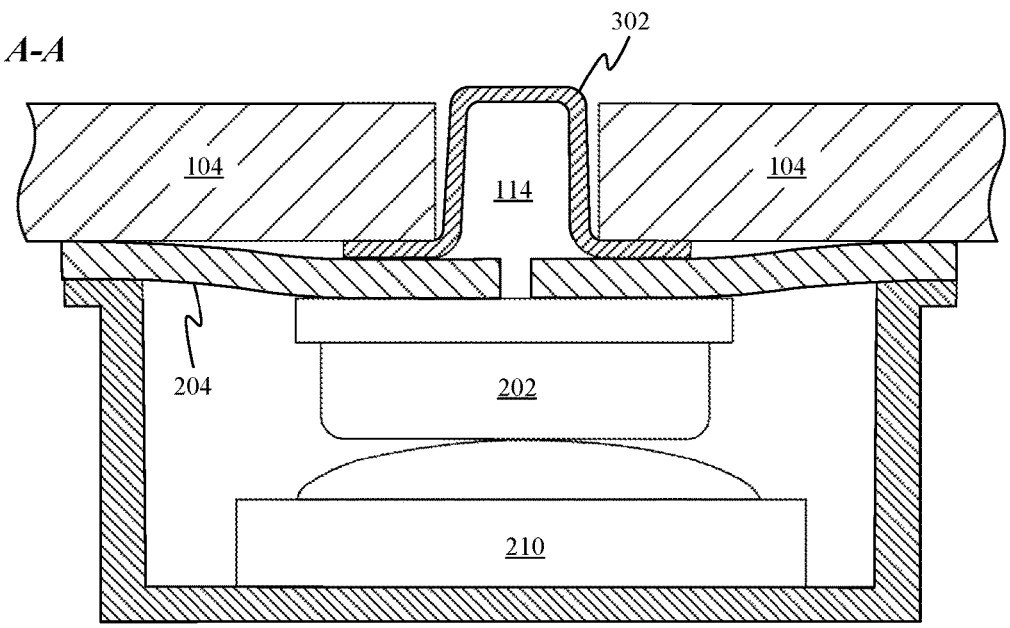
FIGS. 3A-3B show cross-sectional side views of a variation of the portable electronic device depicted in FIG. 1 in accordance with section line A-A.
Figure 3B:
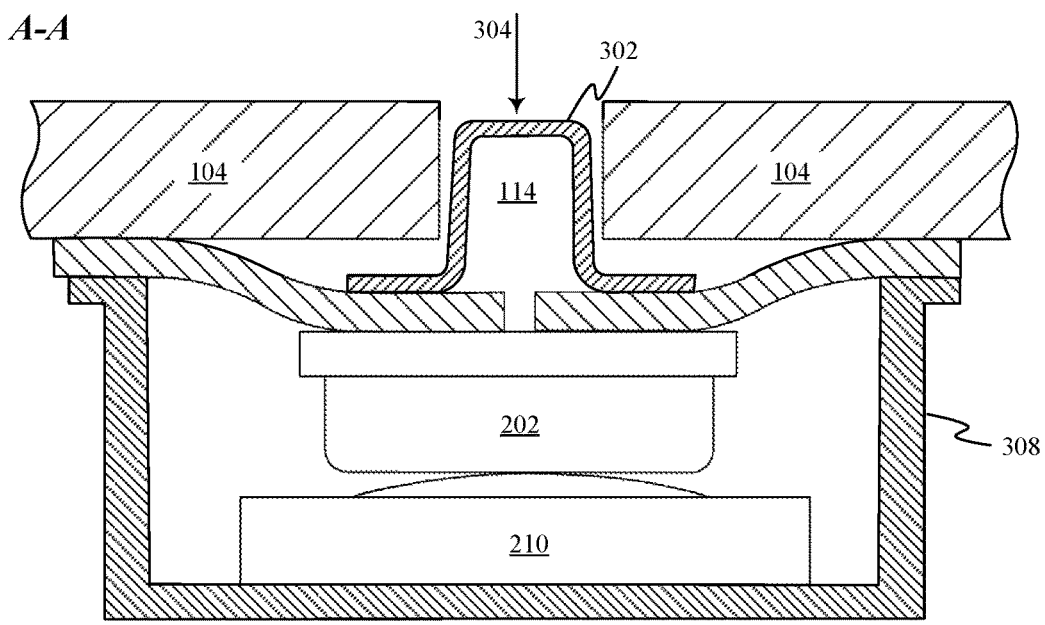

FIGS. 3A-3B show cross-sectional side views of a variation of portable electronic device 100 in accordance with section line A-A. In particular, FIG. 3A shows how acoustic opening 114 can be covered by a cosmetic mesh 302. Cosmetic mesh 302 can be configured to prevent the passage of larger particles into acoustic opening 114 and also presents an aesthetically pleasing cover to acoustic opening 114. In some embodiments, a portion of cosmetic mesh 302 can protrude past or be proud of an exterior surface of device housing component. A mesh matrix forming cosmetic mesh 302 can be formed from robust wiring capable of transferring force received by a finger or other actuating instrument through acoustic fabrice 204 and microphone 202 and then to input control 210.

FIG. 3B shows how a force 304 can be applied to cosmetic mesh 302 without the need for a separate actuating component. In some instances, this force could be applied by a user's finger. In some embodiments, actuation of internal input control 210 can require a surface of cosmetic mesh 302 to be pressed slightly past an exterior surface of device housing component 104. This requirement can reduce the likelihood of internal input control 210 being actuated mistakenly without losing the convenience of being able to actuate the input control with the concerted press of a finger. FIG. 3B also shows how bracket 308 can be attached to device housing component 104 through acoustic fabric 204. In some embodiments, bracket 308 can be welded to device housing component 104 to securely a fix bracket 308 to device housing component 104. This means of coupling can also help to keep acoustic fabric 204 secured to device housing component 104. Bracket 308 is configured to prevent movement of internal input control 210 within device housing 102 or away from microphone 202. In this way, an amount of pressure needed to actuate internal input control 210 can be kept consistent.

Figure 4A:
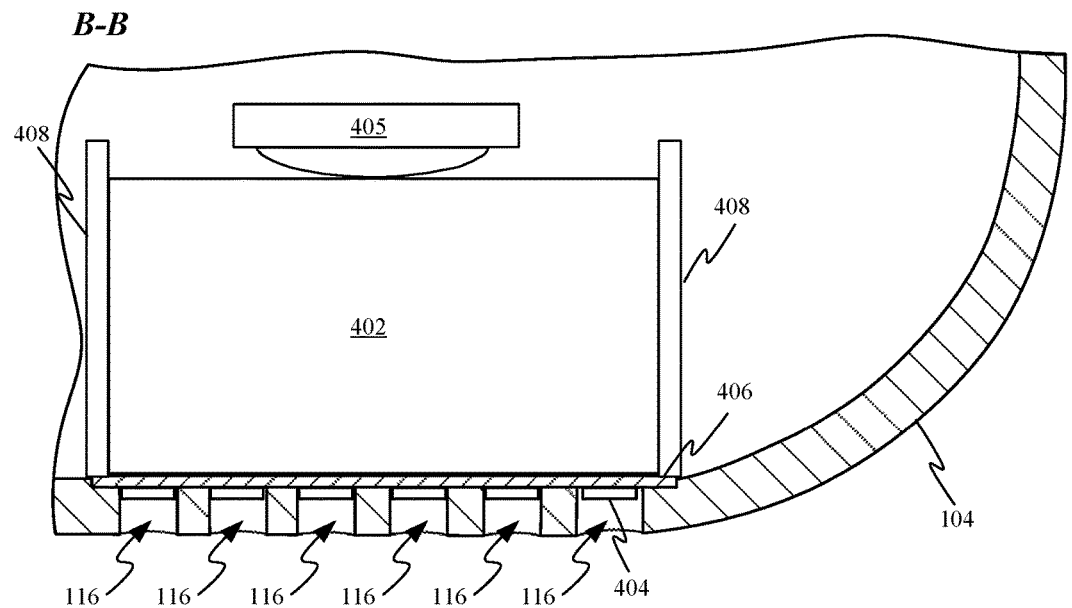
FIGS. 4A-4B show cross-sectional side views of the portable electronic device depicted in FIG. 1 in accordance with section line B-B.
Figure 4B:
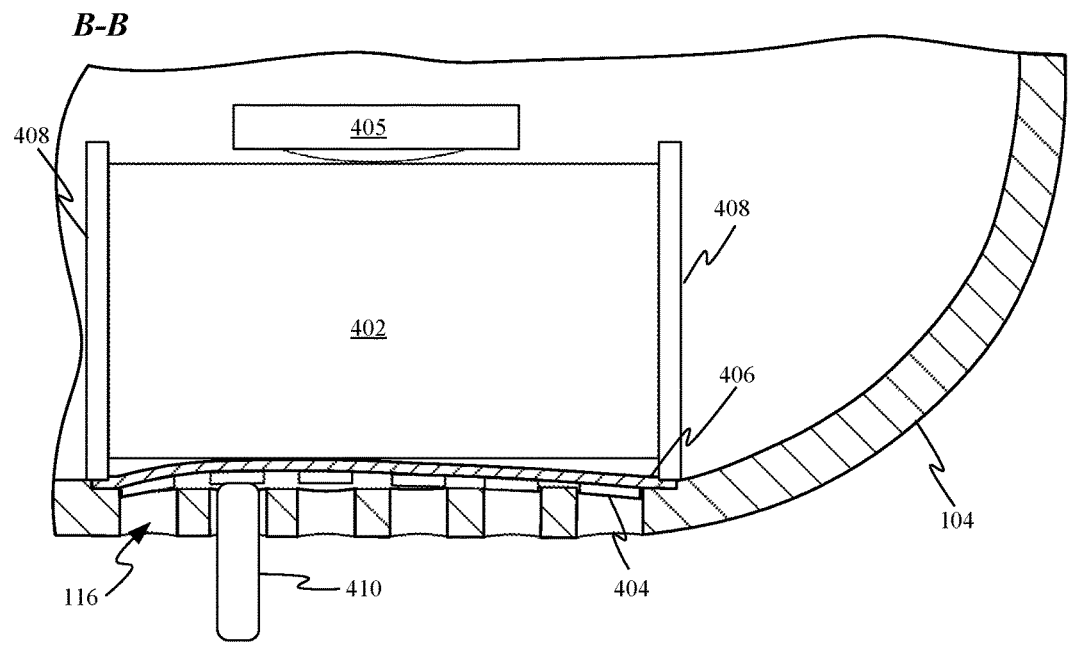

FIGS. 4A-4B show cross-sectional side views of portable electronic device 100 in accordance with section line B-B. Acoustic assembly 402, which can include a speaker and a microphone in some embodiments, is positioned behind a layer of cosmetic mesh 404 and acoustic fabric 406. In some embodiments, acoustic assembly can have its own acoustic housing which encloses the speaker and microphone. The speaker and microphone of acoustic assembly 402 can be configured to emit and sense respectively audio waves propagating through acoustic openings 116. Peripheral portions of acoustic fabric 406 can be adhesively coupled to device housing component 104. Acoustic fabric 406 can be substantially impermeable to liquids while allowing acoustic waves to propagate therethrough, thereby avoiding degradation to the sensitivity of the microphone of acoustic assembly 402 or the output volume of the speaker. In some embodiments, acoustic fabric 406 can include one or more openings near the microphone of acoustic assembly 402 to further improve the sensitivity of microphone to any audio waves passing through acoustic opening 114. Any liquid passing through the openings can enter microphone 202 or even acoustic assembly 402 itself. Acoustic assembly 402 can be a water resistant component and any water entering into acoustic assembly 402 can be prevented from any further ingress within portable electronic device 100 and water captured within acoustic assembly 402 can subsequently be dispelled from acoustic assembly 402 by the force of gravity or by natural evaporative processes.

FIG. 4A shows how acoustic assembly 402 can be mounted to alignment features that take the form of alignment rails 408, which help prevent misalignment of acoustic assembly 402 with acoustic openings 116 when acoustic assembly 402 moves to actuate internal input control 405. In some embodiments, alignment rails 408 can also be used to help affix a periphery of acoustic fabric by compressing acoustic fabric between alignment rails 408 and an interior surface of device housing component 104.

FIG. 4B shows how an actuating component 410 can engage cosmetic mesh 404 to exert a force upon acoustic assembly 402 that pushes acoustic assembly 402 away from acoustic openings 116 to actuate internal input control 405. As depicted, acoustic fabric 406, which covers multiple acoustic openings 116, is able to deform away from all of acoustic openings 116 when acted upon by actuating component 410. However, it should be appreciated that in some embodiments, a separate layer of acoustic fabric could be positioned in front of each of acoustic openings 116 or acoustic fabric could be sealed around each of acoustic openings 116. In this way, only the acoustic fabric directly beneath the acoustic opening 116 that is engaged by actuating component 410 would move away from a respective one of acoustic openings 116. This can be a preferable configuration where some of acoustic openings 116 are not well suited for remaining waterproof when acoustic fabric 406 is pushed away from acoustic openings 116.

Figure 5A:
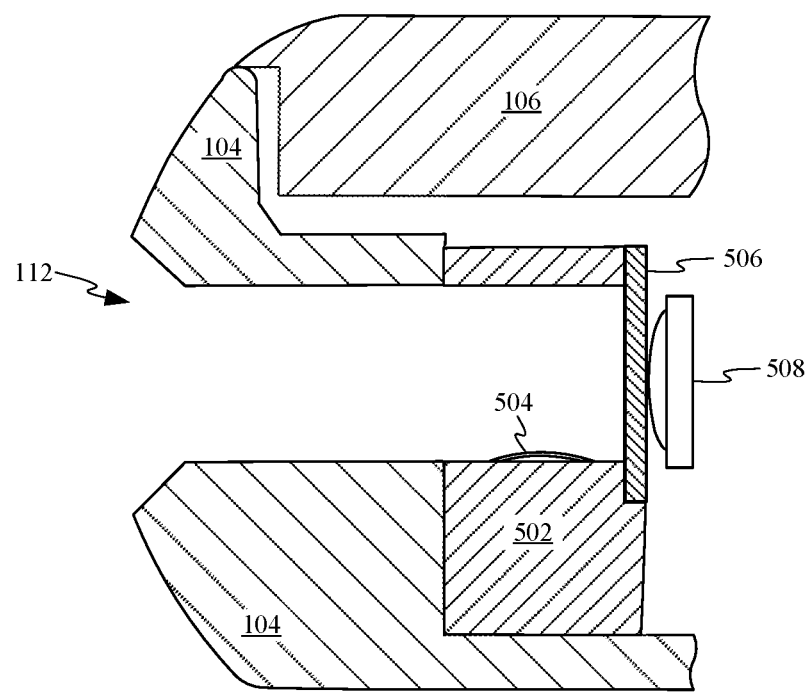
FIGS. 5A-5B show cross-sectional side views of the portable electronic device depicted in FIG. 1 in accordance with section line C-C.

FIG. 5A shows a cross-sectional side view of portable electronic device 100 in accordance with section line C-C. In particular, digital I/O port 112 is depicted and includes plug receptacle 502 having electrical contacts 504. Electrical contacts 504 are configured to mate with contacts on an electrical plug and can enable the rapid transfer of data and/or power into and/or out of portable electronic device 100. FIG. 5A also shows how a rear wall 506 of plug receptacle 502 can be formed from water resistant, elastic material such as for example rubber or other flexible polymeric materials. An internal input control 508 can be placed directly behind rear wall 506.

Figure 5B:
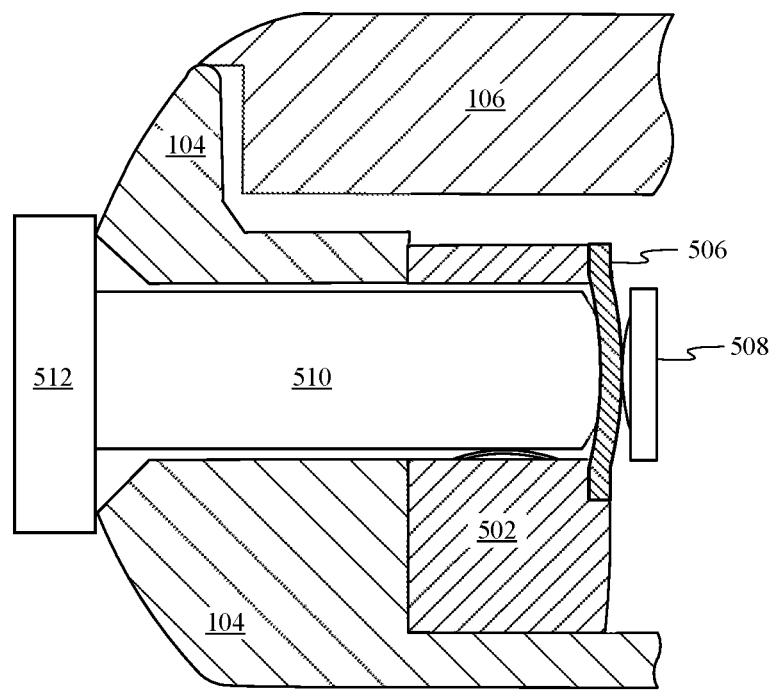

FIG. 5B shows how an actuating element can take the form of actuating plug 510, which can be inserted into digital I/O port 112. Actuating plug 510 is sized to be slightly longer than a standard data plug configured to engage digital I/O port 112. This additional length allows actuating plug 510 to engage and bend rear wall 506 once fully inserted into digital I/O port 112 in order to actuate internal input control 508. In some embodiments, actuating plug 510 can include a base 512 that is wider than an opening leading into digital I/O port 112. In this way, actuating plug 510 can be prevented from applying too much force to internal input control 508. While not depicted in FIG. 5A or 5B internal input control 508 can be held in place by a bracket that is coupled to a lower portions of plug receptacle 502 or device housing component 104. Internal input control 508 can take the form of a dome switch in some embodiments, giving a user of actuating component 208 positive confirmation of internal input control 210 being actuated. In some embodiments, actuating internal input control 508 can wake portable electronic device 100 from a state in which portable electronic device 100 is completely powered off. In some embodiments, actuation of internal input control 508 initiates a hard reset of portable electronic device 100. Actuation of internal input control 508 can also be configured to place portable electronic device 100 into a maintenance or diagnostic mode. When actuating plug 510 is removed from digital I/O port 112, internal input control 508 can return rear wall 506 to the position depicted in FIG. 5A.

Figure 6A:
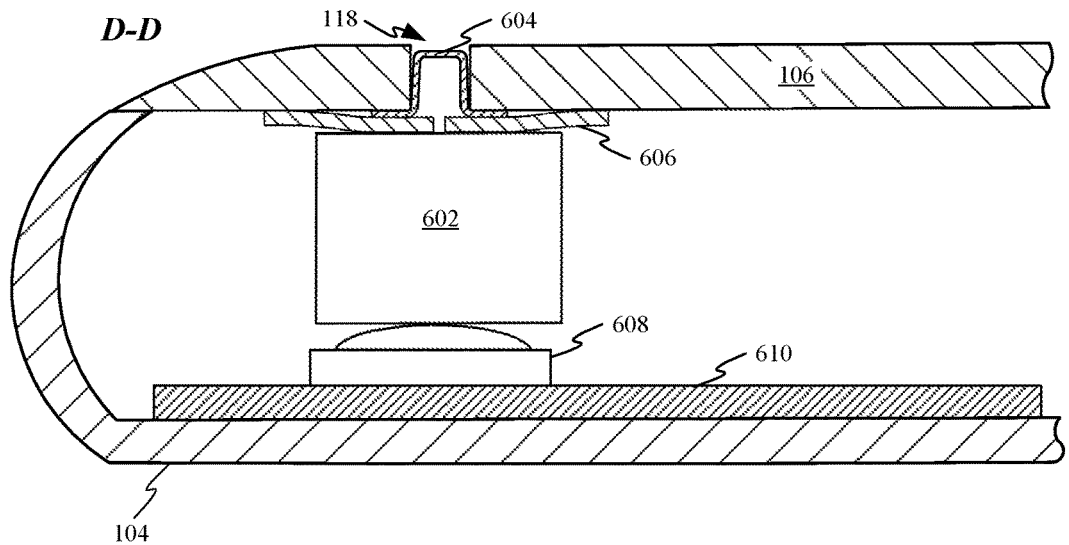
FIGS. 6A-6B show cross-sectional side views of the portable electronic device depicted in FIG. 1 in accordance with section line D-D.
Figure 6B:
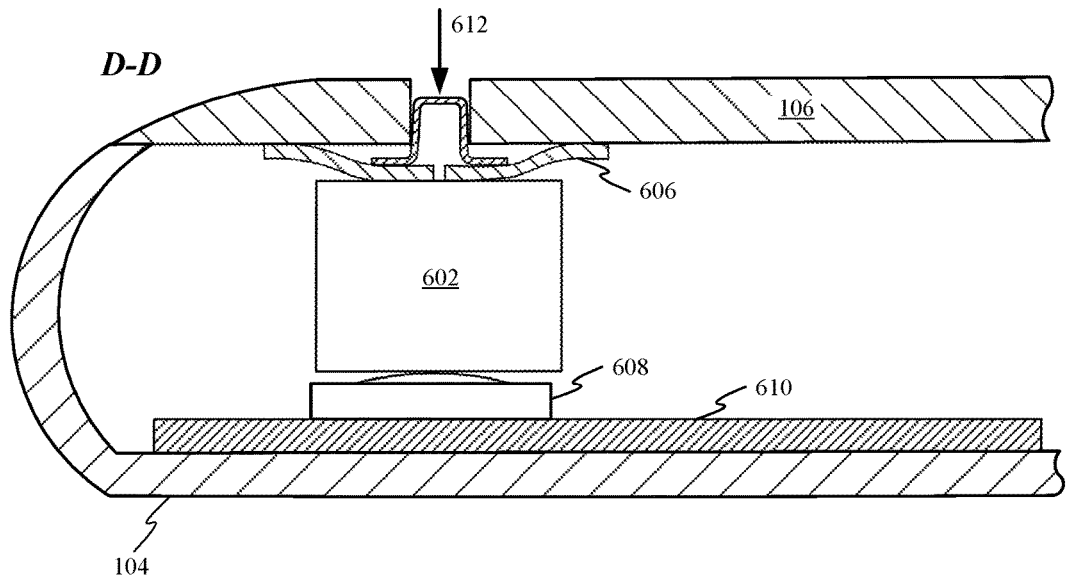

FIGS. 6A-6B show cross-sectional side views of portable electronic device 100 in accordance with section line D-D. In particular, an earpiece speaker 602 is depicted in a position well suited for emitting audio out of portable electronic device through acoustic opening 118. Acoustic opening 118 is defined by touch sensitive display assembly 106. FIG. 6A shows how acoustic opening 118 can be covered by a cosmetic mesh 604. Cosmetic mesh 604 can be configured to prevent the passage of larger particles into acoustic opening 118 and also presents an aesthetically pleasing cover to acoustic opening 118. A mesh matrix forming cosmetic mesh 604 can be formed from robust wiring capable of transferring force received by an actuating component through acoustic mesh 606, earpiece speaker 602 and then to input control 608. Input control 608 can be surface mounted to printed circuit board 610, providing an electrical and mechanical coupling between input control 608 and printed circuit board 610.

FIG. 6B shows how a force 612 can be applied to cosmetic mesh 604. In some embodiments, actuation of input control 608 can require a surface of cosmetic mesh 606 to be pressed well past an exterior surface of touch sensitive display assembly 106. This requirement can reduce the likelihood of input control 608 being actuated mistakenly. FIG. 6B also shows how printed circuit board 610 can be coupled to device housing component 104 providing a robust support structure for printed circuit board 610 and consequently for input control 608. It should be noted that in some embodiments, printed circuit board can take the form of a flexible printed circuit board that allows input control 608 to be supported by device housing component 104. Once force 612 is removed from cosmetic mesh 604, input control 608 can be configured to apply a restoring force upon earpiece speaker 602 to return it to its initial position adjacent to earpiece speaker 602. In some embodiments, the restoring force is provided by a dome switch mechanism disposed within input control 608.

Figure 7:
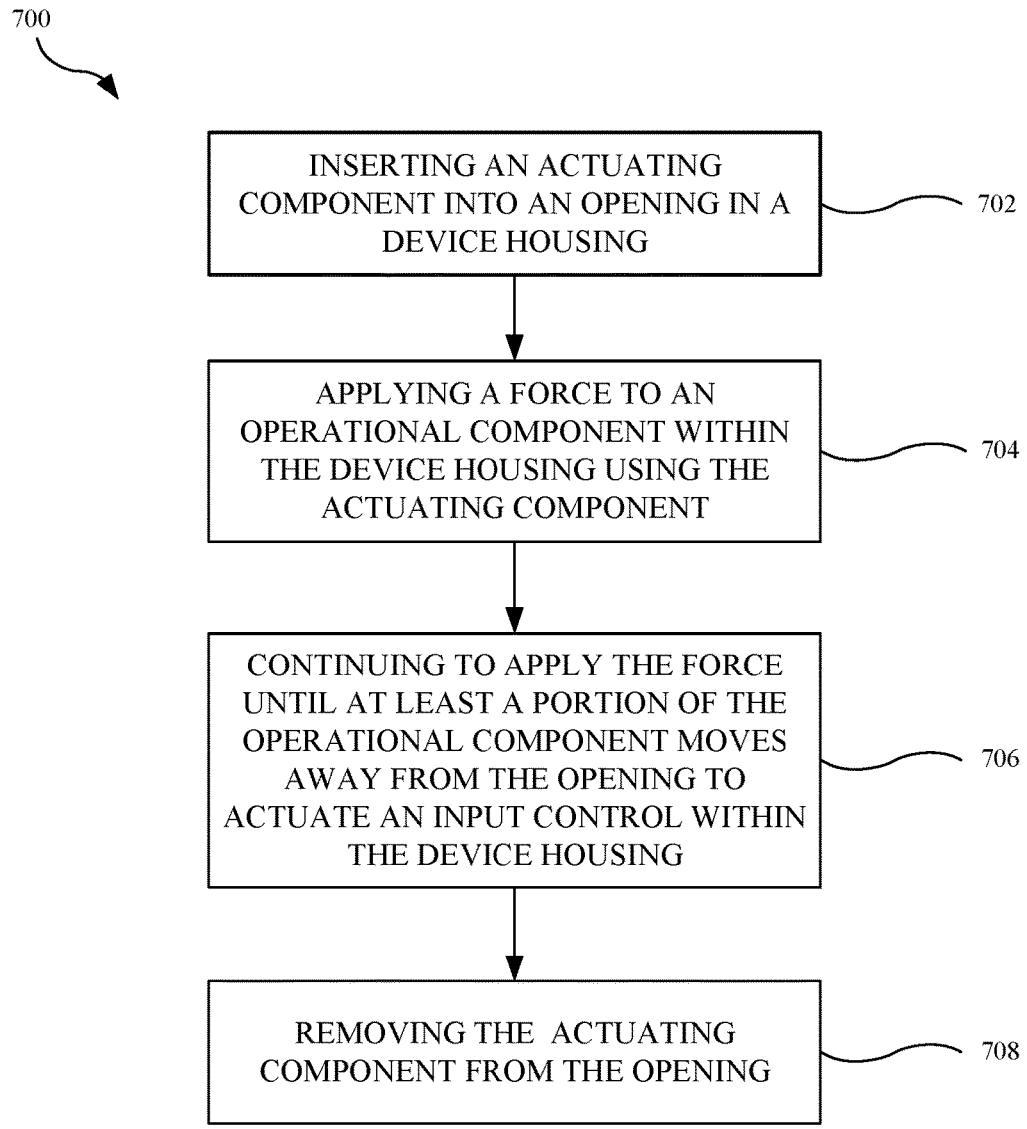
FIG. 7 shows a block diagram depicting a method for actuating an internal input control of a portable electronic device.

FIG. 7 shows a block diagram depicting a method for actuating an internal input control of a portable electronic device. At 702, an actuating element is inserted into an opening in a device housing of a portable electronic device. In some embodiments, the actuating component can take the form of an elongated member sized to fit through the opening in the device housing with a distal end well suited to engage an electrical component disposed at a first position within the device housing. At 704, the actuating component applies a force to the operation component within the device housing. In some embodiments, one or more layers of fabric can be positioned between the opening and the electrical component. At least one of the layers of fabric can be configured to bend or stretch to accommodate insertion of actuating component through the opening and into an interior of the device housing.

FIG. 7 also describes how at 706, the actuating component can be pressed further into the interior of the device housing until the operation al component reaches a second position in which an input control disposed entirely within the device housing is actuated by the electrical component. In some embodiments, actuation can be accomplished purely by mechanical means, while in other embodiments, movement of the actuating component or electrical component can result in a shift in a magnetic field within the device housing that triggers a Hall Effect sensor The electrical component can take the form of a component benefiting from being nearby the opening defined by the device housing. In some embodiments, the operation component can take the form of an acoustic component or digital I/O port component. Actuation of the input control can change an operating state of the portable electronic device. In some embodiments, actuation of the input control can result in the operating state of the portable electronic device changing from a standby or powered off state to an active state. At 708, the actuating component can be withdrawn from the interior of the portable electronic device and from the opening in the device housing. The input control can be configured to apply a restoring force that returns the electrical component back to the first position within the device housing. In some embodiments, the electrical component can alternatively be returned to the first position by springs that act to return the electrical component to the first position.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A portable electronic device, comprising:
   a device housing defining an opening;
   an input control disposed within the device housing; and
   an electrical component disposed in a first position between the input control and the opening, at least a portion of the electrical component being configured to move from the first position to a second position to actuate the input control.

2. The portable electronic device as recited in claim 1, further comprising an acoustic fabric disposed within the device housing, a periphery of the acoustic fabric being secured to an interior facing surface of the device housing.

3. The portable electronic device as recited in claim 2, wherein the acoustic fabric is deformable such that a force applied to the acoustic fabric causes the electrical component to move from the first position to the second position.

4. The portable electronic device as recited in claim 3, further comprising a bracket that supports the input control and is coupled to both the device housing and the periphery of the acoustic fabric.

5. The portable electronic device as recited in claim 1, wherein the electrical component is selected from the group consisting of a microphone, a speaker assembly, a speaker and a plug receptacle.

6. The portable electronic device as recited in claim 1, wherein a direction of movement from the first position to the second position is perpendicular to a plane in which the opening oriented.

7. The portable electronic device as recited in claim 1, wherein the input control is selected from a group consisting of a push button, a dip switch, a toggle switch and a Hall Effect sensor.

8. The portable electronic device as recited in claim 1, wherein the electrical component is a microphone and the entire microphone moves from the first position to the second position to engage the input control.

9. A portable electronic device, comprising:
 a device housing defining an acoustic opening;
 an acoustic fabric adjacent to the acoustic opening;
 a push button disposed within the device housing; and
 a microphone disposed between the push button and the acoustic opening.

10. The portable electronic device as recited in claim 9, wherein the acoustic fabric is deformable such that a force applied to the acoustic fabric causes the microphone to move from a first position to a second position.

11. The portable electronic device as recited in claim 10, wherein the push button comprises a dome switch configured to bias the microphone toward the first position.

12. The portable electronic device as recited in claim 9, wherein the microphone is in direct contact with both the acoustic fabric and the push button.

13. The portable electronic device as recited in claim 9, further comprising a printed circuit board, wherein the push button is surface mounted to the printed circuit board.

14. The portable electronic device as recited in claim 9, wherein the portable electronic device is a smart phone.

15. An electronic device, comprising:
 a device housing comprising a device housing component defining an acoustic opening;
 an input control disposed within the device housing; and
 an acoustic component disposed in a first position proximate the acoustic opening and is between the input control and the acoustic opening, the acoustic component configured to move from the first position to a second position to actuate the input control.

16. The electronic device as recited in claim 15, wherein the acoustic component comprises a microphone configured to characterize acoustic waves propagating through the acoustic opening.

17. The electronic device as recited in claim 15, wherein the input control is a push button.

18. The electronic device as recited in claim 15, wherein the acoustic component comprises a speaker, a microphone and an acoustic housing carrying the speaker and the microphone.

19. The electronic device as recited in claim 15, further comprising a cosmetic mesh disposed within the acoustic opening.

20. The electronic device as recited in claim 19, further comprising an acoustic fabric that is in contact with the cosmetic mesh and the acoustic component.

* * * * *